United States Patent [19]

Heikkilä et al.

[11] Patent Number: 5,637,225
[45] Date of Patent: Jun. 10, 1997

[54] METHOD FOR FRACTIONATING SULPHITE COOKING LIQUOR

[75] Inventors: Heikki Heikkilä, Espoo; Göran Hyöky, Kantvik; Jarmo Kuisma, Kantvik, all of Finland

[73] Assignee: Xyrofin Oy, Helsinki, Finland

[21] Appl. No.: 545,855

[22] PCT Filed: May 9, 1994

[86] PCT No.: PCT/FI94/00179

§ 371 Date: Jan. 16, 1996

§ 102(e) Date: Jan. 16, 1996

[87] PCT Pub. No.: WO94/26380

PCT Pub. Date: Nov. 24, 1994

[30] Foreign Application Priority Data

May 10, 1993 [FI] Finland ................. 932108

[51] Int. Cl.⁶ ........................................... B01D 15/08
[52] U.S. Cl. .................... 210/659; 127/46.2; 162/16; 162/36; 210/198.2
[58] Field of Search ................... 127/30, 46.2, 46.3, 127/55; 162/16, 36; 210/635, 656, 659, 198.2

[56] References Cited

U.S. PATENT DOCUMENTS

| | | | |
|---|---|---|---|
| 4,631,129 | 12/1986 | Heikkila | 210/635 |
| 4,857,642 | 8/1989 | Kulprathipanja | 536/127 |
| 4,990,259 | 2/1991 | Kearney et al. | 210/659 |
| 5,081,026 | 1/1992 | Heikkila | 435/158 |
| 5,084,104 | 1/1992 | Hiekkila et al. | 127/46.2 |
| 5,122,275 | 6/1992 | Rasche | 210/659 |
| 5,198,120 | 3/1993 | Masuda et al. | 210/659 |

FOREIGN PATENT DOCUMENTS

| | | | |
|---|---|---|---|
| 0 279 946A2 | 8/1988 | European Pat. Off. | 210/659 |
| 0 345 511A2 | 12/1989 | European Pat. Off. | 210/659 |
| 86416 | 12/1989 | Finland | 210/659 |
| 40 41 414A1 | 6/1991 | Germany | 210/659 |
| WO 91/08815 | 6/1991 | WIPO | 210/659 |

*Primary Examiner*—Ernest G. Therkorn
*Attorney, Agent, or Firm*—Scully, Scott, Murphy & Presser

[57] ABSTRACT

The invention relates to a method for the fractionation of sulphite cooking liquor by a chromatographic simulated moving bed system in which the liquid flow is effected in a system comprising at least two chromatographic sectional packing material beds. In this method, at least one fraction enriched with monosaccharides and one fraction enriched with lignosulfonates are recovered during a multi-step sequence comprising the following phases: feeding phase of sulphite cooking liquor, eluting phase and recycling phase. The liquid present in the sectional packing material beds with its dry solids profile is recycled in the recycling phase in one or more loops comprising one or more sectional packing material beds.

27 Claims, 4 Drawing Sheets

METHOD FOR FRACTIONATING SULPHITE COOKING LIQUOR

The present invention relates to a method for the fractionation of sulphite cooking liquor by a chromatographic simulated moving bed system in which the liquid flow is effected in a system comprising at least two chromatographic sectional packing material beds. By the method of the invention, sulphite cooking liquor can be fractionated to yield at least two fractions. The invention is related in particular to fractionation of sulphite cooking liquor into at least three fractions, xylose being concentrated in one of said fractions and lignosulphonates being concentrated in another of said fractions. The invention offers an advantageous method particularly for the recovery of xylose from hardwood sulphite cooking liquor in a continuous process. Typically in this method lignosulphonates are recovered as the most rapidly eluted product fraction, and xylose which is the slowest to elute is recovered as the third product fraction.

By sulphite cooking liquor in this context is meant liquor employed in the cooking of sulphite cellulose, liquor ensuing from the cooking, or a part thereof.

In the method of the invention, the product or products are recovered using a multi-step sequence comprising the following phases: feeding phase of sulphite cooking liquor, eluting phase and recycling phase.

In the feeding phase sulphite cooking liquor is introduced into the sectional packing material bed and simultaneously a corresponding amount of product fraction is withdrawn from a later point downstream in the same sectional packing material bed or from a downstream sectional packing material bed (possibly through one or more other sectional packing material beds) connected in series with said bed. The feeding phase may also include all sectional packing material beds in the system.

In the recycling phase the liquid present in the sectional packing material beds with its dry solids profile is recycled in a loop comprising one, two or several sectional packing material beds; this may also include all sectional packing material beds in the system.

The eluting phase comprises feeding of an eluent into a sectional packing material bed and respectively withdrawal of a product fraction or fractions from a downstream point of the packing material bed, from the same sectional packing material bed or a downstream sectional packing material bed.

A process step comprises one or more of the above simultaneous identical or different phases. A step can consist of, for example, a mere feeding phase, recycling phase or eluting phase, a feeding phase and (a) simultaneous recycling and/or eluting phase(s), an eluting phase and (a) simultaneous recycling phase(s), a recycling phase and (a) simultaneous eluting phase(s) etc., and said steps are repeated from one to five times during the sequence.

Said phases are employed to form sequences comprising several successive process steps. In accordance with the invention, a sequence preferably comprises four to ten steps.

A sequence comprising said steps is repeated five to seven times to equilibrate the system, whereafter the process is continued in a state of equilibrium.

Typically from two to twelve, preferably two to six, chromatographic sectional packing material beds combined into one or more loops are employed in the method of the invention. A loop may comprise one, two or several sectional packing material beds packed into one or more columns.

The sulphite cooking liquor comprises, in addition to the cooking chemicals, for example undissolved wood material, lignosulphonates, organic acids, hexose and pentose sugars derived as hydrolysis products of hemicellulose, and also small amounts of oligosaccharides if hydrolysis into monosaccharides has been incomplete. Normally a low pH in pulp cooking contributes to the hydrolysis of hemicellulose into monosaccharides. When the pulp is produced from hardwood, the major part of the monosaccharides contained in the cooking liquor consists of xylose, which can be employed as a raw material in the production of crystalline xylose, xylitol and furfural, for instance. When pulp is produced from softwood, the prevalent monosaccharide in the cooking liquor is mannose.

Economical use of sulphite cooking liquor requires that it is fractionated into its constituents. Fractionating methods suitable for this purpose are disclosed in U.S. Pat. No. 4,631,129 and the references incorporated therein. In accordance with U.S. Pat. No. 4,631,129, the sugars and lignosulphonates can be separated from sulphite spent liquor by a method comprising two chromatographic treatments: in the first treatment, sulphite spent liquor is introduced into a chromatographic column which comprises a strongly acid resin in salt form employed as the column packing material and from which a substantially sugarless fraction rich in lignosulphonates and a fraction rich in sugars are obtained by elution; in the second chromatographic treatment, said fraction which is rich in sugars and the pH of which has been adjusted to 5.5–6.5 is introduced into a second chromatographic column comprising resin in monovalent salt form, and elution thereof yields a second fraction rich in sugars and a second fraction containing lignosulphonates and salts. The method is stated to achieve recovery of sugars, e.g. xylose contained in hardwood sulphite spent liquor, in high purity and high yields. However, the fractionating methods for sulphite cooking liquor in accordance with U.S. Pat. No. 4,631,129 and other prior art are attended by the drawback that they are typically batch methods and are not advantageous in large-scale fractionation of cooking liquor.

Methods are also known for fractionating sulphite cooking liquor by ultrafiltration [cf. e.g. Trivedi, M. K., Fung, D. P. C. and Shen, K. C., Tappi 61 (1978) No. 11, pp. 119–120]. By these methods, which yield only two product fractions, large-molecule lignosulphonates can be recovered; the sugars however end up in the same fraction with the salts.

U.S. Pat. Nos. 4,008,285 and 4,075,406 teach recovery of xylose by a chromatographic method. In this method, a pentosan-containing biomass, e.g. wood raw material, is hydrolysed, the hydrolysate is purified by ion exclusion and colour removal and the resultant solution is fractionated chromatographically to obtain a solution rich in xylose. The fractionating methods disclosed in these patents are also batch processes, and only two product fractions are disclosed to be obtained thereby.

DE Patent 1 692 889 discloses recovery of xylose from sulphite spent liquor by a method in which the spent liquor is extracted with aliphatic alcohols containing 1–5 carbon atoms, the water and alcohol layers formed are separated, alcohol is removed from the latter by distillation, and the resultant syrup-like residue in which the ratio of xylose to lignosulphonates is at most 1:2.5, is maintained at a temperature below room temperature until the xylose is crystallized. The crystallized xylose is ground with ethanol, filtered, and dried. In this method, the lignosulphonates remain in the mother liquor with the salts.

It is an object of the present invention to provide a chromatographic method for continuous fractionation of sulphite cooking liquor, in particular for continuous fractionation of hardwood sulphite cooking liquor, enabling recovery of xylose and lignosulphonates from the cooking liquor.

DESCRIPTION OF THE PREFERRED EMBODIMENTS

Figure 1:
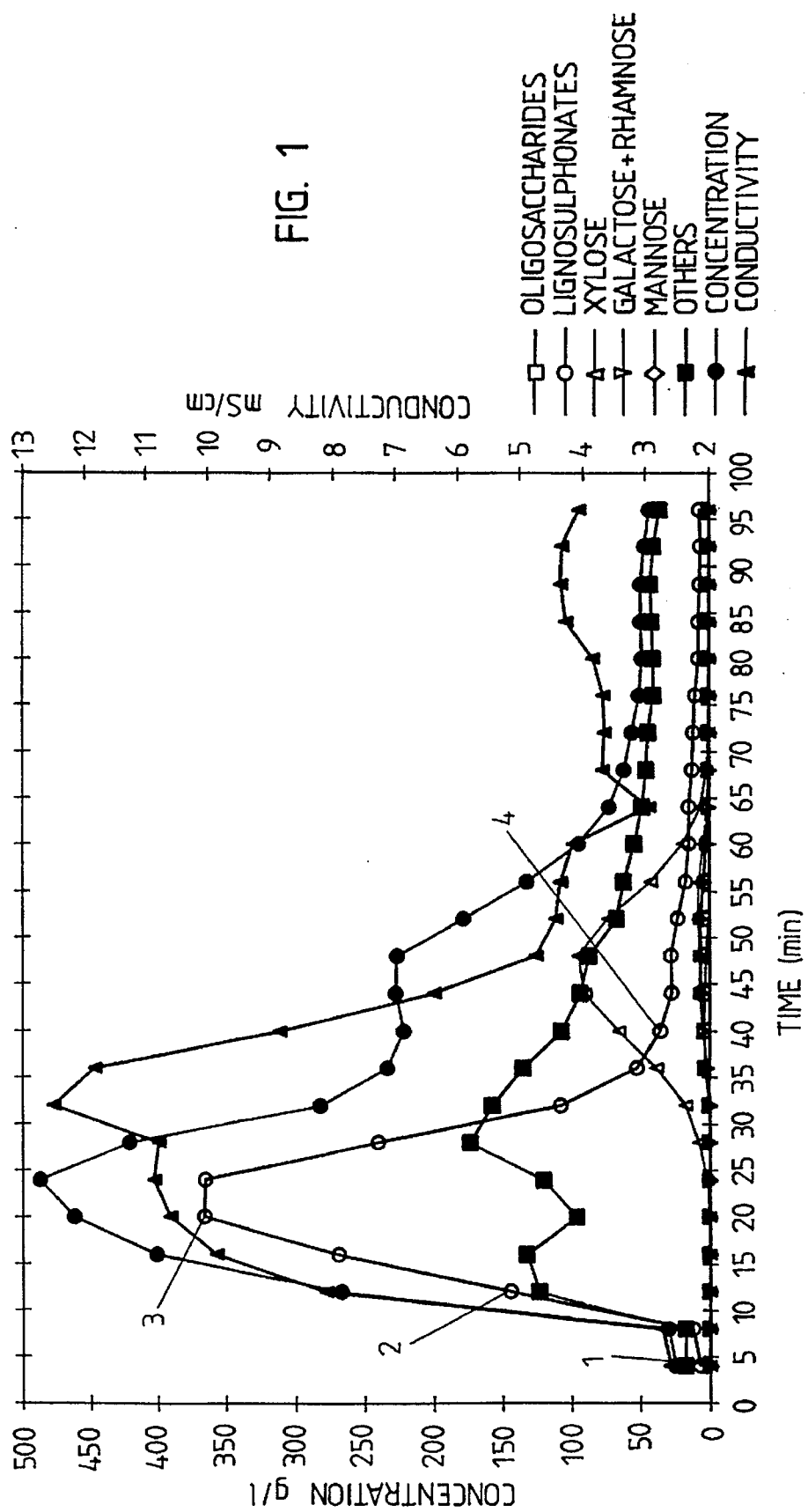
FIGS. 1 and 2 show separation curves for Example 1.

Continuous chromatographic separation processes have in recent years employed what is known as the simulated moving bed system. It was developed and introduced in the U.S.A. at the beginning of the 1960s, initially for petrochemical applications (U.S. Pat. No. 2,985,589). Today several simulated moving bed methods for a number of different applications are known (U.S. Pat. Nos. 3,706,812, 4,157,267, 4,267,054, 4,293,346, 4,312,678, 4,313,015, 4,332,623, 4,359,430, 4,379,751, 4,402,832, 4,412,866, 4,461,649, 4,533,398 and 5,127,957, and published European application 0 279 946).

The simulated moving bed method enables separating performances that are many times higher, and also considerably lower dilution of the products (consumption of eluent), than the batch method.

The simulated moving bed method may be either continuous or sequential.

In a continuous simulated moving bed method, typically all flows are continuous. These flows are: supply of feed solution and eluent, recycling of liquid mixture and withdrawal of products (usually only two). The flow rate for these flows may be adjusted in accordance with the separation goals (yield, purity, capacity). Normally, 8 to 20 sectional packing material beds are combined into a single loop. In accordance with the above-mentioned U.S. Pat. No. 4,402,832, the recycling phases have been employed in recycling dilute fractions. The feed and product withdrawal points are shifted cyclically in the downstream direction in the packing material bed. On account of the supply of eluent and feed solution (and on account of withdrawal of products) and the flow through the packing material bed, a dry solids profile is formed in the packing material bed. Constituents having a lower migration rate in the packing bed are concentrated at the back slope of the dry solids profile, and respectively ingredients having a higher migration rate at the front slope. The feed points for feed solution and eluent and withdrawal points for the product or products are shifted gradually at substantially the same rate at which the dry solids profile moves in the packing material bed. The product or products are withdrawn substantially from the front and back slopes of the dry solids profile; the feed solution is introduced approximately to the maximum point of the dry solids profile and the eluent approximately to the minimum point of the dry solids profile. Part of the separated products are recycled on account of the continuous cyclic flow, and only part of the dry solids profile is withdrawn from the packing material bed during one sequence.

The feed and withdrawal points are shifted cyclically by using feed and product valves and feeding and collection devices located along the packing material bed typically at the upstream and downstream end of each packing material bed. If it is desired to recover product fractions of high purity, short phase times and a plurality of sectional packing material beds must be employed (the apparatus has corresponding valves and feed and withdrawal equipment).

In a sequential simulated moving bed system, not all flows are continuous. In a sequential simulated moving bed method the flows are: supply of feed solution and eluent, recycling of liquid mixture and withdrawal of products (eluting step; two to four, or more, products). The flow rate and the volumes of the different feeds and product fractions may be adjusted in accordance with the separation goals (yield, purity, capacity). The method comprises three basic phases: feed, elution, and recycling. During the feeding phase, a feed solution, and possibly also an eluent during a simultaneous eluting phase, is introduced into predetermined sectional packing material beds, and simultaneously two, three or even four product fractions are withdrawn. During the eluting phase, eluent is introduced into a predetermined sectional packing material bed or predetermined sectional packing material beds, and during said phases two, three or even four product fractions are withdrawn. During the recycling phase, no feed solution or eluent is supplied to the sectional packing material beds and no products are withdrawn. Such a sequential simulated moving bed method applied to the recovery of betaine and sucrose from beet molasses is described in Finnish Patent Application 882740 (U.S. Pat. No. 5,127,957). Also the Applicants' copending Finnish application 930321 (filing date Jan. 26, 1993) relates to the fractionation of molasses by a sequential simulated moving bed method.

The present invention relates to a sequential simulated moving bed method particularly suitable for the fractionation of sulphite cooking liquor into at least three fractions. In this method, the liquid flow is arranged in a system comprising at least two sectional packing material beds, and the products are recovered during a multi-step sequence. The sectional packing material bed may comprise one column; it is however also possible to pack several successive sectional packing material beds in one column, depending on the column structure. On the other hand, several successive columns may form one or more loops.

A sequence comprises feeding, eluting and recycling phases. During the feeding phase, sulphite cooking liquor is introduced into a sectional packing material bed and a corresponding amount of product fraction is withdrawn at a point that may be located either in the same sectional packing material bed as the feed point (in which case the other sectional packing material beds in the system may be located for example in the eluting or recycling step) or in a different sectional packing material bed from that of the feed point, which bed is connected in series (possibly through other sectional packing material beds) with the sectional packing material bed into which the feed is effected. During the recycling phase, the liquid in the sectional packing material beds with its dry solids profile is recycled in a loop comprising one, two or several sectional packing material beds. In the eluting phase, eluent is introduced into the packing material bed and a corresponding amount of product fraction(s) is (are) withdrawn from the same or a downstream sectional packing material bed.

In the method of the invention, recycling is employed such that one, two, three or even more discrete successive loops are formed in the recycling phase. For example, the number of sectional packing material beds being three, these may form one loop (in which case the method is called a single-phase method) or preferably two loops (in which case the method is called a two-phase method), one of said loops comprising one and the other two sectional packing material beds. When the system comprises several successive discrete loops, each of these may be closed or open, that is, when the liquid is recycled in one loop, eluent can be introduced into the other loop and a product fraction can be withdrawn therefrom. During the feed and elution, the flow through the packing material beds may be effected between the successive loops, the flows conveying material from one loop to another. During the recycling phase, the loop is closed and isolated from the other loops. Typically, one separate dry solids profile is recycled in each of said discrete loops. Each sectional packing material bed may form one discrete loop.

It has now been found that the sequential simulated moving bed method of the invention is suitable for simultaneous recovery of xylose and lignosulphonates from sulphite cooking liquor on an industrial scale in high yields and advantageous purity for further processing or use. Furthermore, the salts, oligosaccharides such as xylobiose, and other constituents in the sulphite cooking liquor which are harmful to the production of xylose, can be advantageously removed from the xylose fraction by this method. If a softwood sulphite cooking liquor were the raw material, the prevailing monosaccharide would be mannose and a mannose-rich fraction would be obtained by the method.

If only a xylose fraction and residue fraction were separated in the method, the lignosulphonates would be eluted with the organic and inorganic salts into the residue fraction. However, the method of the invention yields a dry solids profile in which lignosulphonates are concentrated in relation to salts, and they can be recovered by suitably selecting the product withdrawal point.

The manner of realizing the method (single phase or multiphase) and the process parameters employed are selected for example in accordance with the composition of the sulphite cooking liquor employed as the raw material so as to reach an optimum result with regard to the purity and yield of the product and the packing material capacity.

Preferably a strongly acid gel-type cation exchange change resin (e.g. "Zerolit 225", "Finex" or "Purolite") is employed as the packing material, and it preferably has the base form of the cooking liquor. The ionic form of the packing material is equalized in accordance with the base form of the cooking liquor in the course of the process if the cooking liquor has not been subjected to any previous ion exchange.

A cooking liquor from the sulphite cooking of hardwood or any other pentosan-rich biomass is employed as the feed solution. Prior to the separation, the solids contained in the sulphite cooking liquor are removed therefrom by filtration, and the liquor is fed into the separation process at a temperature of 20°–95° C., more preferably 40°–85° C., most preferably 50°–75° C.

Water at 20°–95° C., more preferably 40°–85° C., most preferably 50°–75° C., is employed for the elution.

The linear flow of liquid in the columns is 0.5–12 m$^3$/h/m$^2$, even 20 m$^3$/h/m$^2$, preferably 2–10 m$^3$/h/m$^2$.

The following examples illustrate the sequential simulated moving bed method of the invention for fractionating sulphite cooking liquor. These examples shall not be regarded as restricting the scope of the invention, but they are only examples of special embodiments of the invention.

The dry solids contents indicated have been determined by the Karl Fischer method unless otherwise stated. The lignosulphonate content has been determined by means of UV absorbance measurement (absorptivity 14.25 l·g$^{-1}$·cm$^{-1}$).

In the examples, different types of filtered sulphite spent liquors were employed as feed solutions: solution A had a low xylose content, solution B had a high xylose content and solution C an average xylose content. The feed solutions were hardwood sulphite spent liquors whose compositions were analyzed with a HPLC. All spent liquors had calcium as a base. The analysis results are shown in Table 1, wherein the percentages of the different constituents are given as percent by weight on dry solids.

TABLE 1

| Feed solution analyses | | | |
|---|---|---|---|
| | Solution A | Solution B | Solution C |
| Glucose, % | 1.3 | + | 1.7 |
| Xylose, % | 11.5 | 21.5 | 19.6 |
| Galactose + rhamnose, % | 1.0 | 1.4 | 1.5 |
| Arabinose, % | 0.3 | 0.4 | 0.4 |
| Mannose, % | 1.3 | 1.2 | 1.5 |
| Monosaccharides tot., % | 15.4 | 24.5 | 24.7 |
| Oligosaccharides, % | 0.6 | 1.8 | 0.9 |
| Lignosulphonates, % | 46.3 | 43.3 | 46.5 |
| Others, % | 37.7 | 30.4 | 27.9 |
| pH | 3.4 | 3.8 | 2.1 |
| Conductivity, mS/cm | 9.8 | 3.6 | 11.0 |
| Colour, ICUMSA | 246000 | 71000 | 233000 |
| Dry solids content, % by weight | 47.3 | 54.7 | 33.6 |

EXAMPLE 1

Single-phase Separation Method

The test apparatus included two columns connected in series, feed pumps, recycling pumps, eluent water pumps, flow and pressure regulators, and inlet and product valves for the different process streams. Each column comprised four sectional packing material beds each having a height of about 1.39 m.

The columns were packed with a strongly acid cation exchange resin (Finex V 09 C™). The resin had a polystyrene/divinylbenzene skeleton and was activated with sulphonic acid groups; the mean bead size (in Na$^+$ form) was about 0.36 mm. The resin had a DVB content of 5.5%. Prior to the test the resin had been regenerated to calcium form.

| Test conditions: | |
|---|---|
| Diameter of columns | 0.2 m |
| Total height of resin bed | 11.1 m |
| Temperature | 70° C. |
| Flow rate | 130 and 170 l/h |

The feed solution was the above solution C.

Fractionation was performed by a four-step sequence. The duration of the sequence was 110 minutes, and the sequence comprised the following steps:

Step 1: 60 l of feed solution were introduced (feeding phase) into column 1 at a flow rate 130 l/h, and a 60 l residue fraction 1 was eluted from the downstream end of the same column. Simultaneously water was supplied (eluting phase) to column 2 at a flow rate 170 l/h, and a xylose fraction (45.0 l) and a residue fraction 2/1 (35 l) were eluted from the same column.

Step 2: 64.0 l were recycled (recycling phase) in the loop formed by the two columns, at a rate 130 l/h.

Step 3: Water was introduced into column 1 at a rate 130 l/h and simultaneously a residue fraction 2/2 (70 l) was eluted from column 2.

Step 4: 45 l were recycled (recycling phase) in the loop formed by the two columns, at a rate 130 l/h.

After the sequence was completed, the process control program was continued and it returned to step 1. By repeating this sequence five to seven times the system was equilibrated. The method was proceeded with in a state of equilibrium, and the progress of the separation process was monitored with a density meter, a meter for optical activity, and a conductivity meter, and the separation was controlled by a microprocessor whereby precisely defined volumes and flow rates of feeds, recycled liquid and product fractions were controlled employing quantity/volume measuring, valves and pumps.

In this method, four product fractions were withdrawn: a xylose fraction from column 2, one residue fraction from column 1, and two residue fractions from column 2. Analyses of the product fractions withdrawn during one sequence after equalization are presented in Table 2, where the percentages of the different constituents are given as percent by weight on dry solids.

The xylose yield in this fractionation was 75.6% calculated on the product fractions.

TABLE 2

|  | Product fractions | | | |
|---|---|---|---|---|
|  | Xylose | Residue 1 | Residue 2/1 | Residue 2/2 |
| Volume, l | 45 | 60 | 70 | 35 |
| Dry solids content, g/100 ml | 14.0 | 5.1 | 22.8 | 4.0 |
| Xylose, % | 51.5 | 3.3 | 5.3 | 7.1 |
| Monosaccharides, % | 65.3 | 5.8 | 6.8 | 12.9 |
| Oligosaccharides, % | 1.2 | 0.7 | 0.4 | 0.0 |
| Lignosulphonates, % | ---------------not analyzed--------------- | | | |
| Colour, ICUMSA | 25000 | ---------not analyzed--------- | | |

EXAMPLE 2

Single-phase Separation Method

The test apparatus included three columns connected in series, feed pumps, recycling pumps, eluent water pumps, flow and pressure regulators, and inlet and product valves for the different process streams. Each column comprised one sectional packing material bed.

The columns were packed with a strongly acid cation exchange resin (Finex V 09 C™). The resin had a polystyrene/divinylbenzene skeleton and was activated with sulphonic acid groups; the mean bead size (in $Na^+$ form) was about 0.39 mm. The resin had a DVB content of 5.5%. Prior to the test the resin had been regenerated to calcium form.

| Test conditions: | |
|---|---|
| Diameter of columns | 0.11 m |
| Total height of resin bed | 12.0 m |
| Temperature | 70° C. |
| Flow rate | 40 and 60 l/h |

The feed solution was the above solution A.

Fractionation was performed by a six-step sequence. The duration of the sequence was 96 minutes, and the sequence comprised the following steps:

Step 1: 15.5 l of feed solution were introduced (feeding phase) into column 1 at a flow rate 40 l/h, and a 15.5 l residue fraction 1 was eluted from the downstream end of the same column. Simultaneously water was supplied (eluting phase) to column 2 at a flow rate 60 l/h, and a xylose fraction (8.0 l) and a residue fraction 3/1 (18.0 l) containing mainly salts were eluted from column 3.

Step 2: 16.0 l were recycled (recycling phase) in the loop formed by all columns, at a rate 40 l/h.

Step 3: Water was introduced into column 3 at a rate 40 l/h and simultaneously a lignosulphonate-rich fraction (16 l) was eluted from column 2.

Step 4: 13.0 l were recycled (recycling phase) in the loop formed by all columns, at a rate 40 l/h.

Step 5: Water was introduced into column 1 at a rate 40 l/h, and simultaneously a residue fraction 3/2 (6.0 l) was eluted from column 3.

Step 6: 13.0 l were recycled (recycling step) in the loop formed by all columns, at a rate 40 l/h.

After the sequence was completed, the process control program was continued and it returned to step 1. By repeating this sequence five to seven times the system was equilibrated. The method was proceeded with in a state of equilibrium, and the progress of the separation process was monitored with a density meter, a meter for optical activity, and a conductivity meter, and the separation was controlled by a microprocessor whereby precisely defined volumes and flow rates of feeds, recycled liquid and product fractions were controlled employing quantity/volume measuring, valves and pumps.

In this method, five product fractions were withdrawn: a xylose fraction from column 3, a residue fraction from column 1, two residue fractions from column 3 and a lignosulphonate-rich fraction from column 2. Analyses of the product fractions withdrawn during one sequence after equalization are presented in Table 3, where the percentages of the different constituents are given as percent by weight on dry solids.

TABLE 3

|  | Product fractions | | | |
|---|---|---|---|---|
|  | Xylose | Residue 1 | Ligno-sulphonate-rich fraction | Residues 3/1 + 3/2 |
| Volume, l | 8.0 | 15.5 | 16.0 | 24.0 |
| Dry solids content, g/100 ml | 14.9 | 8.5 | 37.2 | 7.3 |
| Xylose, % | 53.1 | 0.9 | 0.7 | 2.1 |
| Monosaccharides, % | 69.4 | 2.0 | 0.9 | 4.2 |
| Oligosaccharides, % | 0.1 | 1.0 | 0 | 0 |
| Lignosulphonates, % | 9.1 | 33.8 | 64.5 | 42.5 |
| Colour, ICUMSA | 25000 | 148000 | 298000 | 53000 |

The xylose yield in this fractionation was 87.4% calculated on the product fractions.

Figure 2:
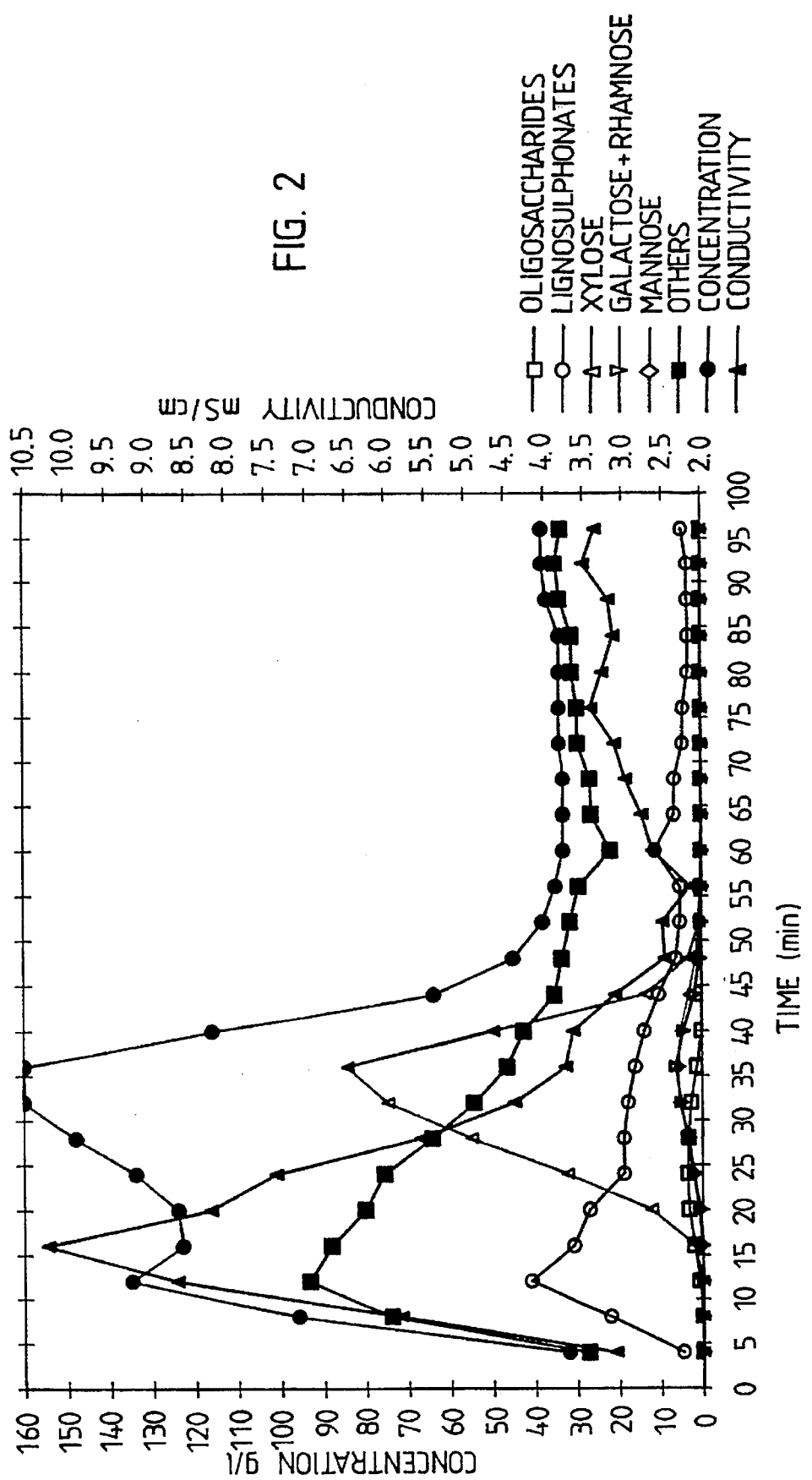

FIG. 1 shows separation curves of column 2 for this fractionation. As can be seen from FIG. 1 and Table 3, the lignosulphonate-rich fraction is withdrawn from column 2. In the samples taken from the bottom of column 2 at the lignosulphonate peak at intervals of four minutes, the lignosulphonate contents were 67.0, 79.2 and 75.0% on dry solids. FIG. 2 shows the separation curves of column 3 for this fractionation.

EXAMPLE 3

The fractionation of Example 2 was repeated, but additionally the separation of lignosulphonates having varying molar masses was analyzed.

Beginning from the start of the separation profile, samples were taken (four samples per column) wherefrom the molar mass distribution of the lignosulphonates was analyzed. The molar mass range was divided into five sections: more than 100 000 g/mol, 100 000–40 000 g/mol, 40 000–10 000 g/mol, 10 000–4 400 g/mol and less than 4 400 g/mol. For column 2, FIG. 1 indicates by numbers 1–4 the points at which the samples were taken. The results obtained are shown in Table 4, which also shows for comparison the corresponding analysis results of the feed solution.

Large-molecule lignosulphonates are concentrated in the lignosulphonate-rich fraction (samples 2 and 3).

TABLE 4

Percentage molar mass distribution of lignosulphonates

| | Molar mass, g/mol | | | | |
|---|---|---|---|---|---|
| | >100000 | >40000 <100000 | >10000 <40000 | >4400 <10000 | <4400 |
| Feed solution | 2 | 2 | 10 | 76 | 10 |
| Sample 1 | 0 | 0 | 0 | 47 | 53 |
| Sample 2 | 3 | 4 | 13 | 77 | 3 |
| Sample 3 | 2 | 3 | 12 | 79 | 4 |
| Sample 4 | 0 | 0 | 0 | 70 | 30 |

EXAMPLE 4

Two-phase Separation Method

A chromatographic test apparatus comprising three columns, feed pumps, recycling pumps, eluent water pumps, flow and pressure regulators, and inlet and product valves for the different process streams was employed. The separation apparatus comprised two loops, one of which was constituted by columns 1 and 2 in series and the other by column 3.

The feed solution and the packing material of the columns were the same as in Example 2.

Test conditions:

| Diameter of columns | 0.11 m |
|---|---|
| Total height of resin bed | 12.0 m |
| Temperature | 75° C. |
| Flow rate | 25–75 l/h |

Fractionation was performed by a four-step sequence. The duration of the sequence was 76 minutes, and the sequence comprised the following steps:

Step 1: 15.0 l of feed solution were introduced (feeding phase) into column 1 at a flow rate 30 l/h, and a 15.0 l residue fraction 1 was eluted from the downstream end of the same column. Simultaneously 18.0 l of water were supplied (eluting phase) to column 2 at a flow rate 35 l/h, and a residue fraction 3 (18.0 l) was eluted from column 3.

Step 2: Recycling (recycling phase) in the loop formed by columns 1 and 2 (13.0 l; 50 l/h); simultaneously water was supplied to column 3 and a recycle fraction (3.0 l; 35 l/h) was eluted from column 3.

Step 3: Water was introduced into column 1, and simultaneously a lignosulphonate-rich fraction (20.0 l; 75 l/h) was eluted from column 2, water was supplied to column 3 and a xylose fraction (18.0 l; 35 l/h was eluted from column 3.

Step 4: Recycling (recycling phase) in the loop formed by columns 1 and 2 (5.8 l; 75 l/h) and in the separate loop formed by column 3 (3.4 l; 25 l/h).

After the sequence was completed, the process control program was continued and it returned to step 1. By repeating this sequence five to seven times the system was equilibrated, whereafter the method was proceeded with in a state of equilibrium.

In this method, four product fractions were withdrawn: a residue fraction from columns 1 and 3, a lignosulphonate-rich fraction from column 2 and a xylose fraction from column 3. The recycling fraction taken from column 3 was added to the feed solution. Analyses of the product fractions withdrawn during one sequence after equalization and of the recycling fraction are presented in Table 5, where the percentages of the different constituents are given as percent by weight on dry solids.

The xylose yield in this fractionation was 92.2%.

TABLE 5

| | Product fractions and recycling fraction | | | | |
|---|---|---|---|---|---|
| | Xylose | Residue 1 | Lignosulphonate-rich fraction | Residue 3 | Recycl. |
| Volume, l | 18.0 | 15.0 | 20.0 | 18.0 | 3.0 |
| Dry solids content, g/100 ml | 11.2 | 10.1 | 31.6 | 1.6 | 4.8 |
| Xylose, % | 44.2 | 1.8 | 0.7 | 1.4 | 12.4 |
| Monosaccharides, % | 56.7 | 2.2 | 0.8 | 4.1 | 19.7 |
| Oligosaccharides, % | 0.1 | 0.0 | 0.0 | 0.0 | 0.4 |
| Lignosulphonates, % | 10.8 | 46.1 | 62.4 | 37.9 | 4.7 |
| Colour, ICUMSA | 25000 | 167000 | 270000 | 111000 | 63000 |

EXAMPLE 5

Two-phase Separation Method

Fractionation was performed employing the separation apparatus described in Example 4, comprising two loops, and also the procedure of Example 4, except that the volume parameters and flow rates of the feeds and withdrawn fractions were varied. These variations were due to the higher xylose content of the feed solution.

The packing material of the columns was the same as in Examples 2–4. The feed solution was solution B above.

| Test conditions: | |
| --- | --- |
| Diameter of columns | 0.11 m |
| Total height of resin bed | 12.0 m |
| Temperature | 75° C. |
| Flow rate | 9–75 l/h |

Fractionation was performed by a four-step sequence. The duration of the sequence was 84 minutes, and the sequence comprised the following steps:

Step 1: As step 1 in Example 4.

Step 2: Recycling (recycling phase) in the loop formed by columns 1 and 2 (13.0 l; 50 l/h); simultaneously water was supplied to column 3 and a recycle fraction (5.0 l; 35 l/h) was eluted from column 3.

Step 3: Water was introduced into column 1, and simultaneously a lignosulphonate-rich fraction (20.0 l; 75 l/h) was eluted from column 2, water was supplied to column 3 and a xylose fraction (17.0 l; 35 l/h was eluted from column 3.

Step 4: Recycling (recycling phase) in the loop formed by columns 1 and 2 (5.8 l; 75 l/h) and in the separate loop formed by column 3 (2.2 l; 9 l/h).

This sequence was repeated five to seven times, whereafter the system was equilibrated and the method was proceeded with in a state of equilibrium.

In this method, four product fractions were withdrawn: a residue fraction from columns 1 and 3, a lignosulphonate-rich fraction from column 2 and a xylose fraction from column 3. The recycling fraction taken from column 3 was added to the feed solution.

Analyses of the product fractions and recycling fraction withdrawn during one sequence after equalization are presented in Table 6. Percentages are given as percent by weight on dry solids.

The xylose yield in this fractionation was 90.7%.

Figure 3:
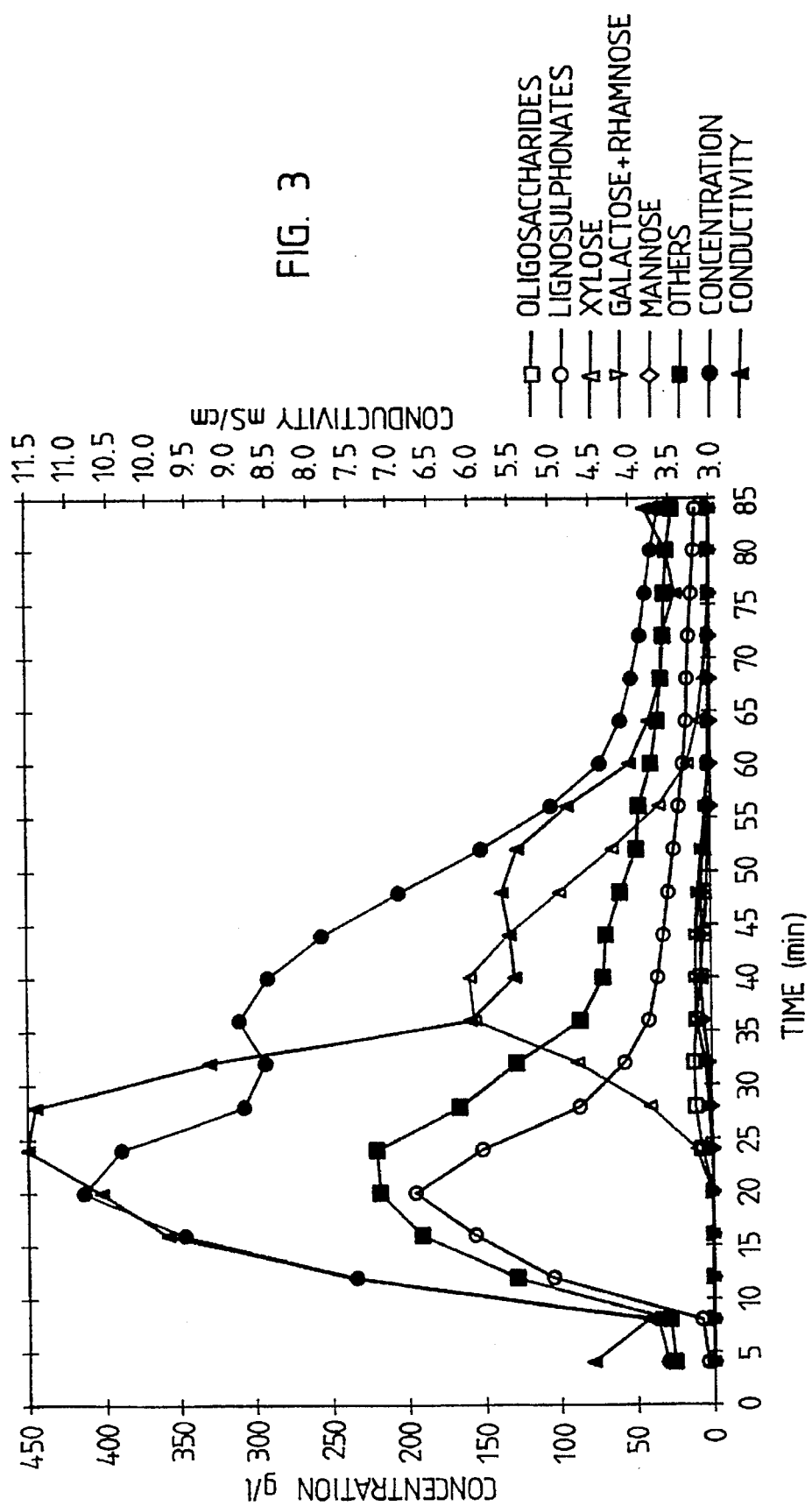
FIGS. 3 and 4 show separation curves for Example 5.
Figure 4:
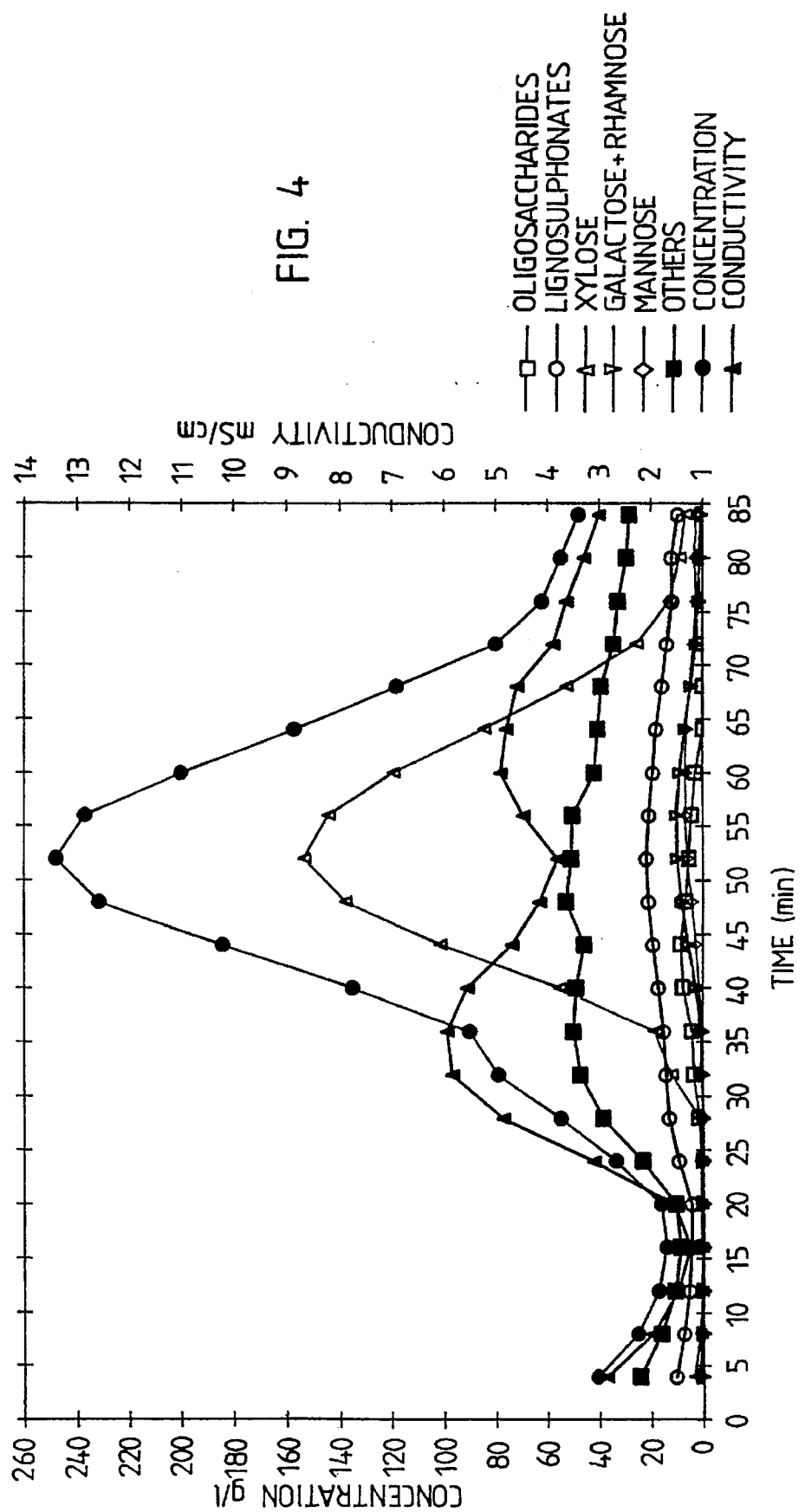

The separation curves for this fractionation of column 2 are shown in FIG. 3 and of column 3 in FIG. 4.

Table 6 shows that the oligosaccharide content in the xylose fraction is the smallest of all withdrawn fractions and smaller than in the feed (solution B).

TABLE 6

| | Product fractions and residue fraction | | | | |
| --- | --- | --- | --- | --- | --- |
| | Xylose | Residue 1 | Lignosulphonate-rich fraction | Residue 3 | Recycl. |
| Volume, 1 | 17.0 | 15.0 | 20.0 | 18.0 | 5.0 |
| Dry solids content, g/100 ml | 17.9 | 10.9 | 33.0 | 2.8 | 13.6 |
| Xylose, % | 59.2 | 3.7 | 1.6 | 3.8 | 42.9 |
| Monosaccharides, % | 71.2 | 4.2 | 2.2 | 4.1 | 54.3 |
| Oligosaccharides, % | 1.3 | 1.5 | 1.5 | 1.9 | 4.3 |
| Lignosulphonates, % | 10.4 | 39.1 | 53.0 | 27.4 | 13.6 |
| Colour, ICUMSA | 25000 | 66000 | 95000 | 42000 | 63000 |

EXAMPLE 6

Two-phase Separation Method

Fractionation was performed employing the separation apparatus described in Example 5, comprising two loops, and also the same packing material and feed solution as in Example 5. Also the test conditions were the same as in Example 5 except for the flow rates; no recycling fraction however was withdrawn.

The duration of the sequence was 84 minutes and the sequence comprised the following four steps:

Step 1: 15.0 l of feed solution were introduced (feeding step) into column 1 at a flow rate 37 l/h, and a 15.0 l residue fraction 1 was eluted from the downstream end of the same column. Simultaneously 18.5 l of water were supplied (eluting step) to column 2 at a flow rate 30 l/h, and a xylose fraction (18.5 l) was eluted from column 3.

Step 2: Recycling (recycling phase) in the loop formed by columns 1 and 2 (13.0 l; 50 l/h) and in the separate loop formed by column 3 (0.5 l; 9 l/h).

Step 3: Water was introduced into column 1, and simultaneously a residue fraction 2 (20.0 l; 75 l/h) was eluted from column 2, water was supplied to column 3 and a residue fraction 3 (8 l; 35 l/h) was eluted from column 3.

Step 4: Recycling (recycling phase) in the loop formed by columns 1 and 2 (5.8 l; 75 l/h) and in the separate loop formed by column 3 (0.6 l; 9 l/h).

In this method, four product fractions were withdrawn: a residue fraction from each column and a xylose fraction from column 3. Analyses of the product fractions and recycling fraction withdrawn during one sequence after equalization are presented in Table 7, where the percentages of the different constituents are given as percent by weight on dry solids. The dry solids content was determined by refractometric measurements.

The xylose yield in this fractionation was 89.2%.

TABLE 7

| | Product fractions | | | |
| --- | --- | --- | --- | --- |
| | Xylose | Residue 1 | Residue 2 | Residue 3 |
| Volume, 1 | 18.5 | 15.0 | 20.0 | 8.0 |
| Dry solids content, g/100 ml | 13.7 | 10.5 | 33.1 | 10.9 |
| Xylose, % | 53.2 | 3.9 | 1.3 | 1.8 |
| Monosaccharides, % | 62.5 | 4.5 | 1.6 | 2.1 |
| Oligosaccharides, % | 1.1 | 1.6 | 1.2 | 1.1 |
| Lignosulphonates, % | ----------------not analyzed-------------- | | | |
| Colour, ICUMSA | ----------------not analyzed-------------- | | | |

We claim:

1. A method for the fractionation of sulphite cooking liquor by a sequential chromatographic simulated moving bed system in which the liquid flow is effected in a system comprising at least two chromatographic sectional packing material beds wherein at least one fraction enriched with monosaccharides and one fraction enriched with lignosulfonates are recovered during a multi-step sequence comprising the following phases: feeding phase of sulphite cooking liquor, eluting phase and recycling phase, the liquid present in the sectional packing material beds with its dry solids profile or profiles being recycled in the recycling phase in one or more loops comprising one or more sectional packing material beds.

2. A method as claimed in claim 1, wherein all said sectional packing material beds of the system in series form a loop.

3. A method as claimed in claim 1, wherein said sectional packing material beds of the system form two or more separate loops each comprising one or more sectional packing material beds.

4. A method as claimed in claim 3, wherein a step of said multi-step sequence comprises one or more recycling phase(s) and/or eluting phase(s) and withdrawal of a product fraction.

5. A method as claimed in claim 3, wherein a step of said multi-step sequence comprises two or more recycling phases.

6. A method as claimed in any one of claims 1-4, wherein a step of said multi-step sequence comprises a feeding step for sulphite cooking liquor and/or one or more eluting step(s) and withdrawal of a product fraction or fractions.

7. A method as claimed in claim 6, wherein said product fractions are a xylose fraction and/or a lignosulphonate-rich fraction and/or residue fraction.

8. A method as claimed in claim 7, wherein oligosaccharides are separated substantially in said residue fractions.

9. A method as claimed in claim 1, wherein said sulphite cooking liquor is liquor employed in the cooking of sulphite cellulose, liquor ensuing from the cooking, or a part thereof.

10. A method as claimed in claim 1, wherein at least three fractions are recovered.

11. A method as claimed in claim 1, wherein said multi-step sequence comprises 4-10 steps.

12. A method as claimed in claim 11, wherein said multi-step sequence comprising said steps is repeated five to seven times to equilibrate the system, and the method is continued in the state of equilibrium reached.

13. A method as claimed in claim 1, wherein said system comprises 2-12 chromatographic sectional packing material beds.

14. A method as claimed in claim 13, wherein said system comprises 3-6 chromatographic sectional packing material beds.

15. A method as claimed in claim 1, wherein said sectional packing material bed is one column.

16. A method as claimed in claim 15, wherein two or more sectional packing material beds are provided in said column.

17. A method as claimed in claim 1, wherein the packing material constituting said sectional packing material bed is a strongly acid cation exchange resin.

18. A method as claimed in claim 17, wherein said cation exchange resin has a divinylbenzene content of 4-8%.

19. A method as claimed in claim 17 or 18, wherein said strongly acid cation exchange resin has the base form of the cooking liquor.

20. A method as claimed in claim 19, wherein said strongly acid cation exchange resin is in the $Ca^{2+}$ form.

21. A method as claimed in claim 1, wherein the temperature of the feed solution and the eluent water is about 20°-95° C.

22. A method as claimed in claim 21, wherein said temperature of the feed solution and the eluent water is about 50°-75° C.

23. A method as claimed in claim 1, wherein the dry solids content of the feed solution is 20-75% by weight.

24. A method as claimed in claim 22, wherein said dry solids content of the feed solution is 35-65% by weight.

25. A method as claimed in claim 1, wherein the linear flow rate of the liquid is 0.5-20 $m^3/h/m^2$.

26. A method as claimed in claim 25, wherein said linear flow rate of the liquid is 2-10 $m^3/h/m^2$.

27. A method as claimed in claim 1, wherein lignosulphonates with a high molar mass are concentrated in said lignosulphonate-rich fraction.

* * * * *